United States Patent [19]

Biernoth et al.

[11] Patent Number: 4,716,047

[45] Date of Patent: Dec. 29, 1987

[54] FAT BLENDS CONTAINING MILK FAT OR A MILK FAT FRACTION AND NON-MILK FAT, AND SPREADS CONTAINING SAID FAT BLENDS

[75] Inventors: Gerhard Biernoth, Quickborn; Hans-Udo Menz, Schenefeld; Klaus H. Todt; Theophil Wieske, both of Hamburg, all of Fed. Rep. of Germany

[73] Assignee: Lever Brothers Company, New York, N.Y.

[21] Appl. No.: 821,105

[22] Filed: Jan. 21, 1986

[30] Foreign Application Priority Data

Jan. 24, 1985 [GB] United Kingdom ................. 8501778

[51] Int. Cl.$^4$ .............................................. A23D 3/00
[52] U.S. Cl. ..................... 426/603; 426/604; 426/607
[58] Field of Search ........................ 426/603, 604, 607

[56] References Cited

U.S. PATENT DOCUMENTS

| | | | |
|---|---|---|---|
| 4,087,564 | 5/1978 | Poot et al. ............................ | 426/603 |
| 4,315,955 | 2/1982 | Cramer ................................ | 426/585 |
| 4,396,639 | 8/1983 | Bodor et al. ...................... | 426/607 X |
| 4,521,440 | 6/1985 | Lansbergen ...................... | 426/603 X |
| 4,567,056 | 1/1986 | Schmidt ........................... | 426/603 X |
| 4,590,087 | 5/1986 | Pronk et al. ......................... | 426/603 |

FOREIGN PATENT DOCUMENTS

| | | |
|---|---|---|
| 69731 | 12/1975 | Australia . |
| 098663 | 1/1984 | European Pat. Off. . |
| 032808 | 3/1984 | European Pat. Off. . |
| 106620 | 4/1984 | European Pat. Off. . |
| 109721 | 5/1984 | European Pat. Off. . |
| 129293 | 12/1984 | European Pat. Off. . |
| 1217395 | 12/1970 | United Kingdom . |
| 2021140 | 11/1979 | United Kingdom . |
| 2130232 | 5/1984 | United Kingdom . |

*Primary Examiner*—Raymond N. Jones
*Assistant Examiner*—Celine Callahan
*Attorney, Agent, or Firm*—Gerard J. McGowan, Jr.; James J. Farrell

[57] ABSTRACT

Fat blends comprising milk fat and a non-milk fat comprising specific triglycerides, the composition of which being such that spreads produced from said fat blends have a plasticity and organoleptic properties reminiscent of dairy butter.

22 Claims, No Drawings

FAT BLENDS CONTAINING MILK FAT OR A MILK FAT FRACTION AND NON-MILK FAT, AND SPREADS CONTAINING SAID FAT BLENDS

The present invention relates to new fat blends containing milk fat or a fraction thereof and a non-milk fat.

The present invention also relates to water- and oil-containing emulsion spreads, particularly margarines and reduced-fat spreads, wherein the fatty phase contains said fat blends.

There is a need of products displaying the advantageous butter-like properties, i.e. the elasticity, plasticity and melting behaviour, of natural, dairy butter as described in J. Dairy Res. 8, 245 (1937), J. C. Davies, and the British Food Manuf. Ind. Res. Inst., The Rheology of Margarines and Compound Cooling Fats, Part I (Res. Rep. 37) and Part II (Res. Rep. 69), 1956, J. H. Prentice.

In trying to imitate dairy butter by replacing part or all of the butterfat by a non-milk fat, a product is obtained which often has a plasticity or a melting behaviour worse than those of dairy butter. Consequently, although a cheaper product can be produced, such a product, does not give full satisfaction.

GB No. 1 217 395 describes the preparation of spreads based on both a liquid vegetable oil and milk fat by churning a cream containing said vegetable oil and milk fat. The amount of liquid oil used is limited to a maximum of about 30%, since otherwise the spread becomes too soft. Moreover, up to 70% of the total fat consists of milk fat, as a result of which the product is rather expensive.

European patent application No. 01016620 describes a butter-like spread in which the fatty phase contains at least 35%, on the total fat, of triglycerides of nondairy origin. The only criteria given for selecting the triglycerides of non-dairy origin are the ranges of fat solids contents at 5° and at 20° C.

Extensive research carried out by Applicants has resulted in a precise definition of the criteria which are crucial for selecting non-milk fats which can be used at relatively high levels along with milk fats to give fat blends having a plasticity and a melting behaviour close to those of natural dairy butter.

The fat blends according to the invention comprise milk fat or a milk fat fraction and a non-milk fat, i.e. a fat of non-dairy origin, wherein (i) the non-milk fat comprises glycerides selected from the group consisting of $S_2X$, SYZ, SZY, SYY and SZZ glycerides;

(ii) the total amount of SYZ, SZY, $SY_2$ and $SZ_2$ glycerides is at least 12 wt. % when the amount of $S_2X$ glycerides is less than 7 wt. %, based on the non-milk fat;

(iii) the total amount of SYZ, SZY, $SY_2$ and $SZ_2$ glycerides is at least 3 wt. % when the amount of $S_2X$ glycerides is at least 7 wt. %, based on the non-milk fat, S being a saturated fatty acid residue containing 16 or more carbon atoms, X is a saturated fatty acid residue containing 2–8 carbon atoms, a cis-unsaturated fatty acid containing 16 or more carbon atoms, or a hydroxy group, Y is a trans-unsaturated fatty acid residue containing 16 or more carbon atoms and Z is a saturated fatty acid residue containing 12 or 14 carbon atoms.

The non-milk fat preferably contains 15–50 wt. % (based on the weight of the milk fat) of triglycerides selected from the group consisting of $S_2X$, SYZ, SYY and SZZ triglycerides, and 50–85 wt. % of triglycerides having a composition such that the fat solids profile of the non-milk fat corresponds to the following percentages of crystallized fat measured by NMR: $N_{10° C.}=15-65$; $N_{20° C.}=10-30$; $N_{35° C.}=0-3$.

NMR measurements are carried out as described in Fette, Seifen, Anstrichmittel, 80, 180–186 (1978).

The preferred fat solids profile will generally correspond to: $N_{10° C.}=30-60$; $N_{20° C.}=12-25$; $N_{35° C.}=0-2$. The fat solids profiles of the total fat blend will also correspond to those given for the non-milk fat.

The selected glycerides $S_2X$, SYZ, $SY_2$ and $SZ_2$ are critical for maintaining butter-likeness. The remainder of the glycerides (50–85% in the non-milk fat mixture of triglycerides) may consist of any of the following triglycerides: $S_3$, $S_2Y$, $S_2Z$, $Y_3$, $Y_2Z$, $YZ_2$, $Z_3$, $X_3$, $XY_2$, $XZY$, $XZ_2$, SXY, SXZ, $X_3$, $X_2S$, $X_2Z$, $X_2Y$, or combinations thereof, wherein S, X, Y and Z have the same meaning as above and are of less importance with regard to butterlikeness.

The saturated fatty acids (S) will generally contain 16 or 18 carbon atoms, although the chains may contain up to 24 carbon atoms.

The cis-unsaturated fatty acids (X) and the transunsaturated fatty acid (Y) generally contain 16 or 18 carbon atoms, although the chain may in principle contain up to 24 carbon atoms.

The proportions and the nature of the various glycerides of the non-milk fat are preferably selected such that the level of palmitic acid residues in the total fat blend exceeds 12 wt. % and preferably ranges from 12 to 45 wt. %.

In the fat blends according to the invention either milk fat, e.g. in the form of butterfat or butter or a milk fat fraction can be used in a proportion which may vary from 10 to 90 wt. %, preferably from 15 to 60% of the total amount of fat, while the proportion of nonmilk fat may range from 90–10 wt. %, preferably from 40–85 wt. %.

The milk fat fraction can be a fraction obtained by fractionation of milk fat in the presence of a solvent such as acetone or hexane, or in the presence of a surface-active substance (so-called Lanza fractionation) or in the absence of a solvent (dry fractionation). Dry fractionation is preferably carried out at a temperature ranging from 15°–30° C., preferably from 23°–28° C., to obtain a lower-melting olein fraction and a higher-melting stearin fraction.

The non-milk fat is preferably at least partially obtained by random interesterification of suitable sources of said long-chain ($C_{16}$ or more) saturated, cis- and trans-unsaturated, medium-chain ($C_{12}$ or $C_{14}$) and short-chain ($C_2$–$C_8$) fatty acids in order to obtain a broad spectrum of triglycerides The interesterified mixture is preferably subsequently fractionated to remove high-melting stearins containing $S_3$ triglycerides A suitable source of medium-chain saturated fatty acids is e.g. coconut oil, palmkernel oil, babassu oil, ouricurum oil, murumuru oil or tucum oil.

A suitable source of long-chain and particularly $C_{16}$ fatty acids is e.g. palm oil or cottonseed oil, tallow, fish oil or fractions thereof. A suitable source of long-chain and particularly of saturated $C_{18}$ fatty acids is hydrogenated oil such as hydrogenated soybean oil, maize oil, rapeseed oil, safflower oil, olive oil, and sunflower oil, etc.

A suitable source of long-chain and particularly of cis-unsaturated $C_{18}$ fatty acids is non-hydrogenated soybean oil, rapeseed oil, sunflower oil, maize oil, safflower oil, grapeseed oil, etc.

A suitable source of trans-unsaturated fatty acids is any of the above oils which has been partly hydrogenated under conditions promoting isomerism, e.g. by using a sulphur-poisoned Ni catalyst at a temperature ranging from 140° to 180° C.

A preferred fat blend according to the invention contains a non-milk fat comprising a mixture of triglycerides obtained by (a) random interesterification of an oil rich in $C_{16}$ fatty acids and a partly hydrogenated oil rich in $C_{18}$ fatty acids and (b) fractionation of the interesterified mixture to remove most of the triglycerides from 3 saturated $C_{16}$-$C_{18}$ fatty acids.

The preferred fats rich in $C_{16}$ fatty acids are tallow and palm oil while the preferred partly hydrogenated oils are selected from soybean oil, sunflower oil, maize oil and rapeseed oil with a melting point ranging from 25°-40° C.

Another preferred fat blend containing a non-milk fat comprising a mixture of triglycerides obtained by random interesterification of a partly hydrogenated oil as defined above and a lauric fat ($C_{12}$-$C_{14}$ fatty acids containing fats) selected from palmkernel oil, coconut oil, babassu oil, murumuru oil, ouricurum oil. Still another preferred fat blend comprises a non-milk fat comprising a mixture of triglycerides obtained by mixing (i) a randomly interesterified mixture of a partly hardened oil having a melting point preferably ranging from 25°-40° C., a non-hydrogenated oil or fat, part of said non-hydrogenated oil or fat optionally consisting of a fat or oil rich in $C_{16}$ fatty acids, preferably consisting of palm oil or tallow;

(ii) an olein fraction obtained by fractionation of a fat rich in $C_{16}$ fatty acids such as tallow or palm oil which has optionally been randomly interesterified before the fractionation and optionally (iii) a fat rich in $C_{16}$ fatty acids preferably consisting of palm oil or tallow.

A particularly useful fat blend containing a non-milk fat comprising (i) an olein obtained by fractionation of tallow or palm oil, preferably in the absence of a solvent, to substantially remove the higher melting stearin consisting of triglycerides from 3 saturated $C_{16}$-$C_{18}$ fatty acids;

(ii) a partly hydrogenated oil having a level of trans-fatty acids ranging from 30-65%.

The fat blends according to the invention are produced by mixing milk fat and non-milk fat under conditions preventing the loss of the microstructure of butter (fat). This is achieved by cold mixing the fat components at a temperature not exceeding 25° C. and preferably at the lower end of the range of 5°-25° C., e.g. between 5° and 10° C. The blending operation is carried out in apparatuses known per se such as a static mixer, a Complector ®, etc.

Oil-and-water emulsion spreads, particularly margarines and reduced-fat spreads, wherein the fatty phase consists of 20-70%, preferably 30-60% of a fat blend as hereinbefore defined can be obtained by applying a texturization treatment involving cooling and working in a way known per se, for instance by churning a cream containing both milk fat and the secondary fat as hereinbefore defined. It is also possible to produce spreads starting from a pre-emulsion of the w/o type which is texturized e.g. in a Votator ® type of apparatus (as described in Margarine by Anderson & Williams, Pergamon Press, 2nd Ed., 1965).

Another way of producing the spreads according to the invention may involve separately proportioning appropriate proportions of the fatty phase and the aqueous phase in the apparatus in which texturization is carried out. It is, of course, also possible to mix dairy butter or cream with a margarine containing the crucial triglycerides as hereinbefore described.

The invention will now be illustrated in the following Examples.

EXAMPLE 1

A fat blend was produced from 30 wt. % non-fractionated whole milk fat and 70 wt. % of an olein obtained by dry fractionation of an interesterified mixture of 75% palm oil and 25% soybean oil hydrogenated to a melting point of 36° C., whereby the higher-melting stearin fraction is separated at 34° C.

The composition of the triglycerides of the olein is summarized in Table I. The level of palmitic acid in the total blend was 19%.

An emulsion (w/o) was produced from 80 wt. % of said fat blend and 20 wt. % of an aqueous phase (bacteriologically soured skimmilk containing 0.2 wt. % monoglyceride). The emulsion was texturized in a Votator ® apparatus to obtain a spread. The spread, when submitted to a panel of experts, was found to display good butter-like properties with regard to consistency and oral melt properties.

EXAMPLE 2

A cream o/w emulsion (40% fat) was produced by emulsifying a randomly interesterified mixture obtained from 20% hydrogenated sunflower oil (m.p. 32° C.), 20% cottonseed oil (m.p. 33° C.) and 60% coconut oil in dairy cream. The fat composition of the cream was 30% milk fat and 70% of the interesterified mixture.

The composition of the triglycerides of the interesterified mixture (non-milk fat) is given in Table I. The level of palmitic acid in the total blend was 18%.

The cream was ripened and subsequently churned in a conventional churning apparatus as described in Margarine by Anderson & Williams, Pergamon Press, 2nd Ed., 1965. The results observed by the panel were similar to those obtained in Example 1.

EXAMPLE 3

A pre-emulsion was produced from 20% of the aqueous phase of Example 1 and a fat phase containing 30% whole milk fat and 70% vegetable fat. The vegetable fat comprised:

(1) 40% of a randomly interesterified mixture of 86% partially hardened soybean oil (m.p.=36° C.), 11% soybean oil and 3% palm oil;

(2) 45% of an olein fraction obtained after separation of a higher-melting stearin from randomly interesterified palm oil, which was fractionated without solvent at 35° C.;

(3) 10% palm olein obtained by solventless fractionation of palm oil at 26° C.; and (4) 5% palm oil.

The composition of the triglycerides of the non-milk fat is given in Table I. The level of palmitic acid was 18% in the total blend.

The premix was worked and cooled in a Votator ®. The panel results were similar to those obtained in Example 2.

EXAMPLE 4

A pre-emulsion was produced from 20% of the aqueous phase of Example 1 and 80% of a fat phase containing 20% whole milk fat, 65% tallow olein obtained by dry fractionation of tallow at 32° C. and separation of the higher-melting stearin, 15% soybean oil (m.p.=36° C., level of trans-fatty acids 60%).

The composition of the triglycerides of the non-milk-fat is given in Table I. The level of palmitic acid was 21% in the total blend.

The pre-emulsion was cooled and further emulsified in a Votator ®. The panel results were similar to those obtained in Example 1.

COMPARATIVE EXAMPLE 5

A premix was formed from 20% aqueous phase and 80% of a fat phase containing 30% milk fat, 35% soybean oil and 35% hydrogenated soybean oil (m.p.=36° C.).

The premix was texturized in a Votator ®.

The composition of the non-milk fat triglycerides is given in Table I. The level of palmitic acid was 16% in the total blend.

COMPARATIVE EXAMPLE 6

A premix was formed from 20% aqueous phase and 80% of a fat phase containing 51% milk fat, 28% sunflower oil and 21% randomly interesterified palm oil.

The composition of the glycerides of the non-milk fat is given in Table I. The level of palmitic acid was 24.3% in the total blend.

The products of Examples 5 and 6 scored, on a scale from 1 to 10, a 3 for spreadability (butter-like consistency) and a 2.5 for oral melt properties.

The products of Examples 1–4 scored a 6 for spreadability and a 7 for oral melt properties, whereas dairy butter, which served as a reference, scored a 9–10 for both spreadability and oral melt properties.

Spreadability/Plasticity test

Butterlike consistency is assessed by a panel which especially judges plasticity and toughness of the product.

Plasticity is scored after pushing a pencil-like rod into the sample. The collar which is formed indicates the degree of plasticity (high collar, little plasticity).

Toughness is assessed during spreading with a knife. The resistance to deformation after working with the knife is expressed as a measure for toughness. Overall butterlike consistency is given on a 10 point scale.

Oral melt is assessed by a panel which scores the sample on a 10 point scale regarding such oral melt aspects as firmness, plasticity, body, quickness of melting, stickiness and waxiness.

TABLE I

Triglyceride class compositions (in wt. %) of the non-milk fats
Triglyceride composition determined by GLC (in wt. %)

| Ex. | 1 | 2 | 3 | 4 | 5 | 6 | 7 | 8 | 9 | 10 | 11 | 12 | 13 + 14 |
|---|---|---|---|---|---|---|---|---|---|---|---|---|---|
| 1 | 2.1 | 1.8 | 1.9 | 30.0 | 3.5 | 0 | 0 | 0 | 0 | 0 | 0 | 5.0 | 55.7 |
| 2 | 0.4 | 1.7 | 2.6 | 1.7 | 9.9 | 8.7 | 1.9 | 1.6 | 19.0 | 5.9 | 26.0 | 12.0 | 8.6 |
| 3 | 2.6 | 2.7 | 0.6 | 21.9 | 5.0 | 0 | 0 | 4.0 | 0 | 0 | 8.1 | 7.7 | 47.4 |
| 4 | 0.9 | 3.4 | 2.5 | 26.3 | 4.4 | 0 | 0 | 3.0 | 0 | 0 | 4.9 | 7.1 | 47.5 |
| Comp. 5 | 0.6 | 3.5 | 0 | 4.7 | 9.6 | 0 | 0 | 7.4 | 0 | 0 | 10.0 | 8.1 | 56.1 |
| Comp. 6 | 5.1 | 0 | 0.3 | 17.8 | 0 | 0 | 0 | 0 | 0 | 0 | 0 | 0.6 | 76.3 |

1 = $S_3$
2 = $S_2Y$
3 = $S_2Z$
4 = $S_2X$
5 = $SY_2$
6 = SZY, SYZ
7 = $SZ_2$
8 = $Y_3$
9 = $Y_2Z + YZ_2$
10 = $Z_3$
11 = $XY_2$ or XZY or $XZ_2$
12 = SX (Y + Z) XYZ or SXZ
13 + 14 = $X_3 + X_2$ (S or Y or Z)

TABLE II

Fat solids profile of the non-milk fat components

| Example | 5° C. | 10° C. | 20° C. | 30° C. | 35° C. |
|---|---|---|---|---|---|
| N° 1 | 61 | 54 | 20 | 3 | 0 |
| 2 | 69 | 59 | 24 | 0 | 0 |
| 3 | 66 | 56 | 23 | 5 | 0.5 |
| 4 | 39 | 31 | 14 | 2.5 | 0 |
| Comp. Ex. 5 | 41 | 36 | 20 | 3.6 | 0 |
| Comp. Ex. 6 | 23 | 19 | 9 | 4 | 1.5 |

We claim:

1. A fat blend comprising 10–90 wt. % of milk fat or a milk fat portion and 90–10 wt. % of a non-milk fat wherein
   (i) the non-milk fat comprises 15–50 wt. % glycerides selected from the group consisting of $S_2X$, SYZ, SZY, SYY, SZZ glycerides and mixtures thereof;
   (ii) the total amount of SYZ, SZY, $SY_2$ and $SZ_2$ glycerides is at least 12 wt. % when the amount of $S_2X$ glycerides is less than 7 wt. %, based on the non-milk fat;
   (iii) the total amount of SYZ, SZY, $SY_2$ and $SZ_2$ glycerides is at least 3 wt. % when the amount of $S_2X$ glycerides is at least 7 wt. %, based on the non-milk fat, and 50–85 wt. % of triglycerides having a composition such that the fat solids profile of the non-milk fat corresponds to the following percentages of crystallized fat measured by NMR: $N_{10°\ C.}$=15–65; $N_{20°\ C.}$=10–30; $N_{35°\ C.}$=0–3
   S being a saturated fatty acid residue containing 16 or more carbon atoms,
   X is a saturated fatty acid residue containing 2–8 carbon atoms, a cis-unsaturated fatty acid containing 16 or more carbon atoms, or a hydroxy group, Y is a trans-unsaturated fatty acid residue containing 16 or more carbon atoms, Z is a saturated fatty acid residue containing 12 or 14 carbon atoms.

2. A process comprising churning the fat blend of claim 1 with an aqueous phase to achieve phase inversion and obtain a spread.

3. Oil and water containing emulsion spreads including 20-70% of a fat blend as defined in claim 1.

4. Oil and water containing emulsion spreads including 30-60% of a fat blend as defined in claim 1.

5. A fat blend according to claim 1, wherein the level of palmitic acid in the total fat blend ranges from 12 to 45 wt. %.

6. A fat blend according to claim 1, wherein the non-milk fat comprises
   (i) an olein obtained by fractionation of tallow or palm oil to substantially remove the higher melting stearin consisting of triglycerides having 3 saturated $C_{16}$-$C_{18}$ fatty acids
   (ii) a partly hydrogenated oil having a level of trans-fatty acids ranging from 30-65%.

7. A process for producing an oil and water containing emulsion spread comprising emulsifying an aqueous phase with a fatty phase consisting of a fat blend as claimed in claim 1, and subjecting the emulsion thus obtained to working and cooling to obtain a spread.

8. The process according to claim 2, comprising producing a pre-emulsion of the w/o-type from a fat blend according to claim 1 and subsequently subjectig it to working and cooling to obtain a spread.

9. The process for producing a water-in-oil emulsion according to claim 7, comprising separately proportioning a fatty phase including a fat blend as claimed in claim 1 and an aqueous phase in a texturizing apparatus and subjecting the phases to cooling and working.

10. A process according to claim 7, wherein a cream comprising a fat blend as claimed in claim 1 is churned to achieve phase inversion and obtain a spread.

11. A fat blend according to claim 1 wherein the non-milk fat comprises a mixture of triglycerides obtained by mixing
   (i) a randomly interesterified mixture of a partly hardened oil having a melting point ranging from 25°-40° C., a non-hydrogenated oil or fat, part of said non-hydrogenated oil or fat comprising a fat or oil rich in $C_{16}$ fatty acids, and
   (ii) an olein fraction obtained by fractionation of a fat rich in $C_{16}$ fatty acids.

12. Fat blend of claim 11 wherein said oil or fat rich is $C_{16}$ fatty acids consists of palm oil or tallow.

13. Fat blend of claim 11 wherein the fat rich in $C_{16}$ fatty acids from which said olein fraction is obtained includes tallow or palm oil.

14. Fat blend of claim 13 wherein said fat rich in $C_{16}$ fatty acids is randomly interesterified before fractionation.

15. Fat blend of claim 11 further comprising a fat rich in $C_{16}$ fatty acids.

16. Fat blend of claim 15 wherein the fat rich in $C_{16}$ fatty acids consists of palm oil or tallow.

17. The fat blend according to claim 1 wherein the non-milk fat comprises a mixture of triglycerides obtained by random interesterification of a partly hydrogenated oil and a fat rich in $C_{12}$-$C_{14}$ fatty acids.

18. A fat blend according to claim 17, wherein the partly hydrogenated oil is selected from soybean oil, sunflower oil, maize oil, rapeseed oil and cottonseed oil hydrogenated to a melting point ranging 25°-40° C. and the fat rich in $C_{12}$-$C_{14}$ fatty acids is selected from the group consisting of palmkernel oil, coconut oil, babassu oil, murumuru oil, ouricurum oil.

19. A fat blend according to claim 1, wherein the non-milk fat comprises a mixture of triglycerides obtained by
   (a) a random interesterification of an oil rich in $C_{16}$ fatty acids and a partly hydrogenated oil rich in $C_{18}$ fatty acids and
   (b) fractionation of the interesterified mixture to remove most of the triglycerides having 3 saturated $C_{16}$-$C_{18}$ fatty acids.

20. A fat blend according to claim 19, wherein the oil rich in $C_{16}$ fatty acids is palm oil or tallow and the partly hydrogenated oil rich in $C_{18}$ fatty acids is selected from soybean oil, sunflower oil, maize oil and rapeseed oil hydrogenated to a melting point ranging from 25°-40° C.

21. A process for producing a fat blend from milk fat and a non-milk fat as defined in claim 1, which comprises blending milk fat and non-milk fat at a temperature ranging from 5°-25° C.

22. A process according to claim 21, wherein blending of the milk fat and non-milk fat is carried out in a static mixer or a Complector ®.

* * * * *